United States Patent [19]

Iriyama et al.

[11] Patent Number: 4,892,075
[45] Date of Patent: Jan. 9, 1990

[54] CRANK ANGLE DETECTING SYSTEM FOR INTERNAL COMBUSTION ENGINES

[75] Inventors: Masahiro Iriyama; Hiroshi Satoh, both of Yokosuka, Japan

[73] Assignee: Nissan Motor Co., Ltd., Japan

[21] Appl. No.: 265,819

[22] Filed: Nov. 1, 1988

[30] Foreign Application Priority Data

Nov. 2, 1987 [JP] Japan .......................... 62-166794[U]
Nov. 2, 1987 [JP] Japan .......................... 62-166795[U]

[51] Int. Cl.⁴ ........................ F02P 5/15; G01M 15/00
[52] U.S. Cl. ..................................... 123/425; 73/115; 73/117.3
[58] Field of Search .................... 123/425, 435; 73/35, 73/115, 116, 117.3

[56] References Cited

U.S. PATENT DOCUMENTS

| | | | |
|---|---|---|---|
| 4,403,505 | 9/1983 | Hattori et al. | 73/115 X |
| 4,621,603 | 11/1986 | Matekunas | 123/425 |
| 4,622,939 | 11/1986 | Matekunas | 123/425 |
| 4,727,842 | 3/1988 | Takahashi | 123/425 |
| 4,802,454 | 2/1989 | Tanaka | 123/251 |

Primary Examiner—Tony M. Argenbright
Attorney, Agent, or Firm—Leydig, Voit & Mayer

[57] ABSTRACT

A crank angle detecting system for an internal combustion engine is provided which comprises a pressure sensor, a crank angle sensor, and crank angle judging device. The pressure sensor is adaptable for sensing pressure within the cylinder and provides pressure signals to the crank angle judging device which are representative of cylinder pressure within the cylinder at three predetermined crank angles in a range defined in the vicinity of a crank angle at which maximum torque is generated. The crank angle judging device determines the crank angle at which the maximum pressure within the cylinder occurs according to a quadratic equation employing the sensed cylinder pressures. The crank angle judging device then judges whether the crank angle at which maximum pressure is presumed to occur is advanced or retarded relative to the best crank angle. The ignition timing is corrected so as to be advanced or retarded according to the resulting judgments.

27 Claims, 6 Drawing Sheets

CRANK ANGLE DETECTING SYSTEM FOR INTERNAL COMBUSTION ENGINES

BACKGROUND OF THE INVENTION

The present invention relates generally to a combustion timing detecting system for internal combustion engines and particularly to a system which detects the crank angle at which the maximum pressure occurs within a cylinder or the occurrence of miss fire.

Usually, the maximum torque output of an internal combustion engine can be obtained if the crank angle $\theta_{pmax}$ at which the maximum cylinder pressure occurs is 15 degrees after top dead center (15 degrees ATDC).

For the purpose of generating maximum torque, the ignition timing may be feedback controlled on the basis of the crank angle $\theta_{pmax}$ at which the maximum pressure occurs within the cylinder. In this technique, if $\theta_{pmax}$ is greater than, for example, 15 degrees ATDC, the ignition timing is advanced, while if $\theta_{pmax}$ is less than 15 degrees ATDC, the ignition timing is retarded.

Highly accurate detection of the crank angle $\theta_{pmax}$ requires precise monitoring of the pressure within the cylinder. The arithmetic processing of the detected value tends to impose a burden on a Central Processing Unit (CPU). For example, Japanese First Publication (tokkaisho) No. 61-68533 discloses a detection method for detecting $\theta_{pmax}$ accurately whereby cylinder pressure is detected at a few predetermined crank angle positions and the pressure curve is deduced mathematically.

For example, the detection of $\theta_{pmax}$ according to the above process is carried out as follows: Cylinder pressure is detected at three detecting angles $\theta_1$ to $\theta_3$ in the vicinity of the desired crank angle at which the pressure within the cylinder reaches a maximum pressure (for example, $\theta_1 = 7$ degrees ATDC, $\theta_2 = 15$ =degrees ATDC, $\theta_3 = 23$ degrees ATDC). Cylinder pressure values $P_1$ to $P_3$ which are representative of the pressure within the cylinder detected at crank angles $\theta_1$ to $\theta_3$ respectively are mathematically processed to obtain an estimated $\theta_{pmax}$.

It will be appreciated that when $\theta_{pmax}$ is between the initial detecting angle $\theta_1$ and the last detecting angle $\theta_3$, it may be estimated accurately. On the other hand, when $\theta_{pmax}$ is outside the range of $\theta_1$ to $\theta_3$, it cannot. However, by examining which is greater $P_1$ or $P_3$, $\theta_{pmax}$ may be presumed that when $P_1$ is greater than $P_3$, $\theta_{pmax}$ is advanced from the target value, and when the $P_1$ is smaller than $P_3$, $\theta_{pmax}$ is retarded from the target value. Thus, it may be determined whether the ignition timing is advanced or retarded.

However, when the ignition timing is greatly retarded, the cylinder pressure curve has two peaks. One is defined by compression at the top dead center. Other is defined by pressure due to combustion. In this case, the peak due to combustion occurs after crank angle $\theta_3$ with the result that the cylinder pressure value $P_1$ is greater than $P_3$. It therefore becomes impossible to judge whether the ignition timing is advanced or retarded.

Moreover, in the above method for estimating $\theta_{pmax}$ when $\theta_{pmax}$ is outside the range defined between $\theta_1$ and $\theta_3$, due to the compression peak, when missing occurs $P_1$ is greater than $P_3$, and it is therefore impossible to judge whether the engine is missing or the spark is advanced.

SUMMARY OF THE INVENTION

It is therefore an object of the present invention to provide a detecting system for detecting the crank angle at which the maximum pressure occurs within the cylinder accurately under all operating conditions including missfire.

According to one aspect of the present invention, there is provided a system for detecting the crank angle at which the pressure within a firing cylinder of an internal combustion engine is maximum and whereby detecting offset of the maximum pressure crank angle from a predetermined target angle, comprising first means for monitoring engine crank angle to produce first signals indicative of first, second and third crank angles within a range defined in the vicinity of the target angle, second means for monitoring engine crank angle to produce a second signal indicative of a fourth crank angle outside of the range, third means for monitoring pressure in the firing cylinder, the third means being responsive to the first and second signals, for producing a pressure value indicative of pressure within the firing cylinder at the first, second, third, and fourth crank angles, fourth means, for comparing the pressure values at the first, second, and third crank angles, for projecting the maximum pressure crank angle when the maximum pressure crank angle is included within the range, and fifth means for deriving direction and magnitude of offset of the maximum pressure crank angle to the target angle based on the pressure values at the first, second, third, and forth angles when the maximum pressure crank angle is not included within the range.

According to a further aspect of the invention, there is provided a system for detecting the crank angle at which the pressure within a firing cylinder of an internal combustion engine is maximum and whereby detecting offset of the maximum pressure angle from a predetermined target angle, comprising first means for monitoring engine crank angle to produce first signals indicative of first, second, and third crank angles within a range defined in the vicinity of said target angle, second means for monitoring pressure in the firing cylinder, the second means being responsive to the first signals, for producing a pressure value indicative of the pressure within the firing cylinder at the first, second, and third angles within the range, third means, for comparing the pressure values at the first, second, and third angles, for projecting the maximum pressure angle when the maximum pressure angle is included within the range, fourth means for deriving direction and magnitude of offset of the maximum pressure angle to the target angle based on the pressure value at the first and third angles when the maximum pressure angle is not included within the range, and fifth means for discriminating whether the maximum pressure angle is advanced relative to the target angle from missfire by comparing the pressure value at the first angle with a reference pressure value when the maximum pressure angle is not included within the range.

According to a further aspect of the invention, there is provided a crank angle detecting system for an internal combustion engine having a plurality of cylinders and a crankshaft comprising, first means for detecting the angular position of a crankshaft, second means for sensing pressure within the cylinder at each of three or more predetermined crank angular positions in a range defined in the vicinity of a target crankshaft angular position for maximum pressure to occur and at a predetermined crankshaft angular position outside of the range, third means for judging whether a crankshaft angular position $\theta_{pmax}$ at which pressure within the cylinder is maximum can be calculated or not according to variations of the pressure within the range, fourth means for determining whether the $\theta_{pmax}$ is advanced or retarded relative to the target angle according to variations of the pressure within the range and at the position outside of the range when the calculation is impossible, and fifth means for calculating the crankshaft angular position $\theta_{pmax}$ when the position $\theta_{pmax}$ is within the range.

According a further aspect of the invention, there is provided a crank angle detecting system for an internal combustion engine having a plurality of cylinders and a crankshaft comprising, first means for detecting the angular position of a crankshaft, second means for sensing pressure within a cylinder at each of three or more predetermined crank angular positions in a range defined in the vicinity of a predetermined target crankshaft angular position for the maximum pressure to occur and at a predetermined crankshaft angular position outside of the range, third means for judging whether a crankshaft angular position $\theta_{pmax}$ at which pressure within the cylinder is maximum can be calculated or not according to variations of pressure within the range, and fourth means for adjusting an ignition timing so as to enable the $\theta_{pmax}$ to be calculated by comparing magnitude of the pressure within the range with that at the position outside of the range.

According to another aspect of the invention, there is provided an ignition timing control system for detecting a crank angle at which maximum pressure occurs within a firing cylinder of an internal combustion engine and detecting offset of said maximum pressure angle from a predetermined target angle, comprising, first means for monitoring engine crank angle to produce first signals indicative of first, second and third crank angles within a range defined in the vicinity of the target angle, second means for monitoring engine crank angle to produce a second signal indicative of a fourth crank angle outside of the range, third means for monitoring pressure in the firing cylinder, the third means being responsive to the first and second signals, for producing a pressure value indicative of the pressure within the firing cylinder at the first, second, third, and fourth angles, fourth means, for comparing the pressure values at the first, second, and third angles, for projecting the maximum pressure angle when the maximum pressure angle is included within the range, fifth means for deriving direction and magnitude of offset of maximum pressure angle to the target angle based on the pressure values at the first, second, third, and forth angles when the maximum pressure angle is not included within the range, sixth means for adjusting an ignition timing so as to enable the maximum pressure to be projected according the direction and magnitude of offset derived by fifth means, and seventh means for controlling the ignition timing by calculating the angle between the maximum pressure angle projected by fourth means and the target angle.

BRIEF DESCRIPTION OF THE DRAWINGS

FIG. 1 (b) is a graph which shows pressure curve within the cylinder when the ignition timing is advanced.

FIG. 1 (c) is a graph which shows pressure curve within the cylinder when the ignition timing is retarded.

DESCRIPTION OF THE PREFERRED EMBODIMENTS

Figure 1C:
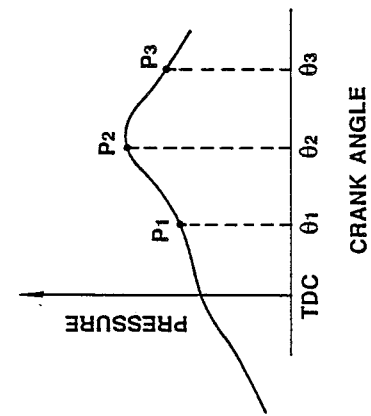
FIG. 1 (a) is a graph which shows pressure curve within the cylinder under optimum ignition timing.
Figure 1B:
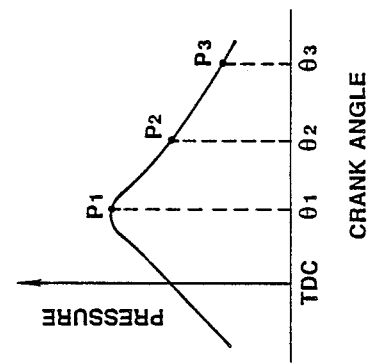
Figure 1A:
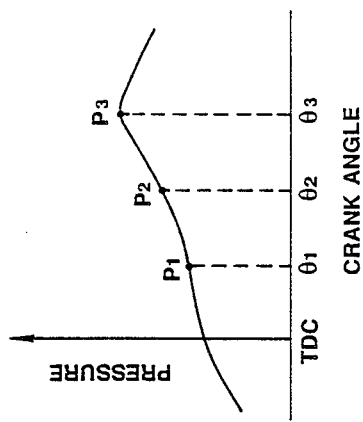

Referring now to the drawings, particularly to FIGS. 1(a), 1(b), and 1(c), curves indicated by solid lines show pressure within the cylinder. Symbols $\theta_1$, $\theta_2$, and $\theta_3$ denote crank angles, which are 7 degrees ATDC, 15 degrees ATDC, and 23 degrees ATDC respectively in the embodiments described hereinbelow. $\theta_2$ is the target crank angle value for maximum pressure within the cylinder. Symbols $P_1$, $P_2$, and $P_3$ denote cylinder pressure values at the corresponding crank angles $\theta_1$, $\theta_2$, and $\theta_3$ respectively. FIG. 1 (a) shows the pressure curve corresponding to the desired ignition timing. FIG. 1 (b) shows a pressure curve corresponding to an advanced ignition timing. FIG. 1 (c) shows a pressure curve corresponding to a retarded ignition timing.

It should be noted that in the best ignition timing, the pressure curve peaks between $P_1$ and $P_3$, while the pressure curves corresponding to advanced or retarded ignition timings do not.

Figure 2:
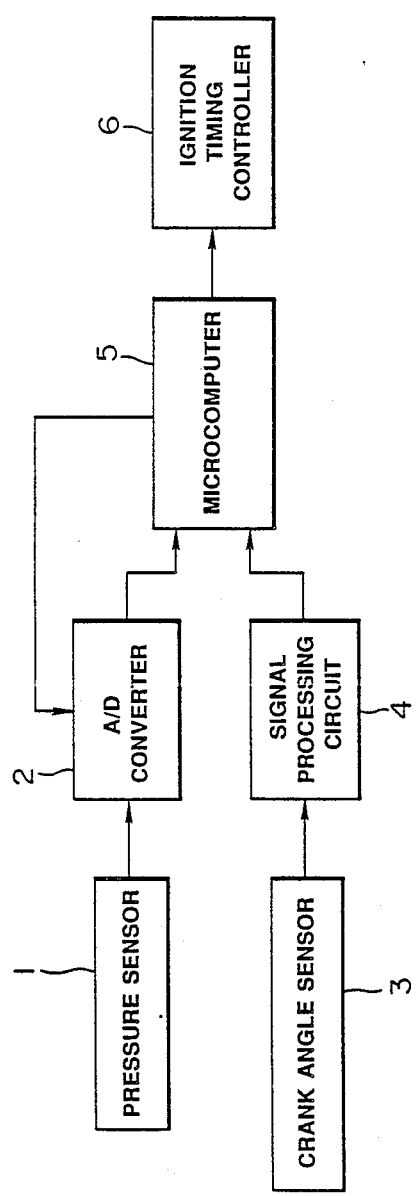
FIG. 2 is a schematic of detecting system according to the present invention.

Referring to FIG. 2, a combustion system according to the present invention includes a pressure sensor 1, an analog to digital converter 2 (A/D converter), a crank angle sensor 3, a signal processing circuit 4, a microcomputer 5, and an ignition timing controller 6. The pressure sensor 1 is, for example, a pizeoelectrical type sensor which is installed in a spark plug seat (not shown) of a combustion engine. A single sensor may be provided for only one cylinder of the engine, or a sensor may be provided for each of the cylinders. The U.S. Pat. No. 4,524,625 discloses a pressure sensor adaptable to sensing pressure in the combustion chamber or chambers of an internal combustion engine. The contents of this application are hereby incorporated by reference. The sensor 1 provides an output signal representative of pressure within the cylinder to the A/D converter 2. The A/D converter 2 changes an analog signal inputted from the pressure sensor 1 to a digital signal on receiving a A/D converter timing signal provided by the microcomputer 5. The crank angle sensor 3 includes a disc which rotates in synchronism with rotation of a crankshaft (not shown), and generates a signal at the predetermined crankshaft angular position once every two revolutions. The U.S. Pat. No. 4,656,993 discloses a crank angle detecting apparatus. The contents of this application are hereby incorporated by reference. The sensor 3 provides an output signal to the microcomputer 5 through the signal processing circuit 4 at every unit angle (for example, one degree) of the crankshaft. The signal processing circuit 4 is provided with a waveform shaping circuit and so forth. The microcomputer 5 includes an Input Output port interface (I/O interface), a Central Processing Unit (CPU), a Random Access Memory (RAM), and a Read Only Memory (ROM).

A first embodiment of crank angle detecting system according to the present invention will now be described hereinbelow.

The microcomputer 5 provides the A/D converter timing signal to the A/D converter 2 according to the input signal from the crank angle sensor 1 at the crank angles $\theta_1$, $\theta_2$, and $\theta_3$, as described above, for detecting pressure within the cylinder and thus obtained values $P_1$, $P_2$, and $P_3$ which are read into the microcomputer 5. The microcomputer 5 then determines mathematically on the basis of the cylinder pressure values $P_1$ to $P_3$, the crank angle $\theta_{pmax}$ at which the maximum pressure within the cylinder occurs, according to the flowchart in FIG. 3. Alternatively, the microcomputer 5 judges whether the $\theta_{pmax}$ is advanced or retarded relative to the target angle $\theta_2$ by comparing the magnitudes of the cylinder pressure values $P_1$ to $P_3$ to provide an output signal to the ignition timing controller 6. If the resulting judgments indicate that the $\theta_{pmax}$ is advanced, or that ignition timing is advanced, the microcomputer 5 compares the cylinder pressure value $P_1$ at the angle $\theta_1$, which is nearest the top dead center among the $\theta_1$ to $\theta_3$, in this embodiment in FIG. 4, with a threshold level $P_{TL}$ so as to judge whether missing has occurred.

Thus, the microcomputer 5 can judge whether the crank angle $\theta_{pmax}$ is advanced or retarded relative to the target angle $\theta_2$ or whether the cylinder is missing.

While, in this embodiment, the crank angle $\theta_1$ has been selected as the angle at which pressure within the cylinder is compared with the threshold level $P_{SL}$, additional detection may be performed in the vicinity of the top dead center. Further the angles $\theta_1$, $\theta_2$, and $\theta_3$ are not limited to the specific crank angles indicated in this embodiment.

Figure 3:
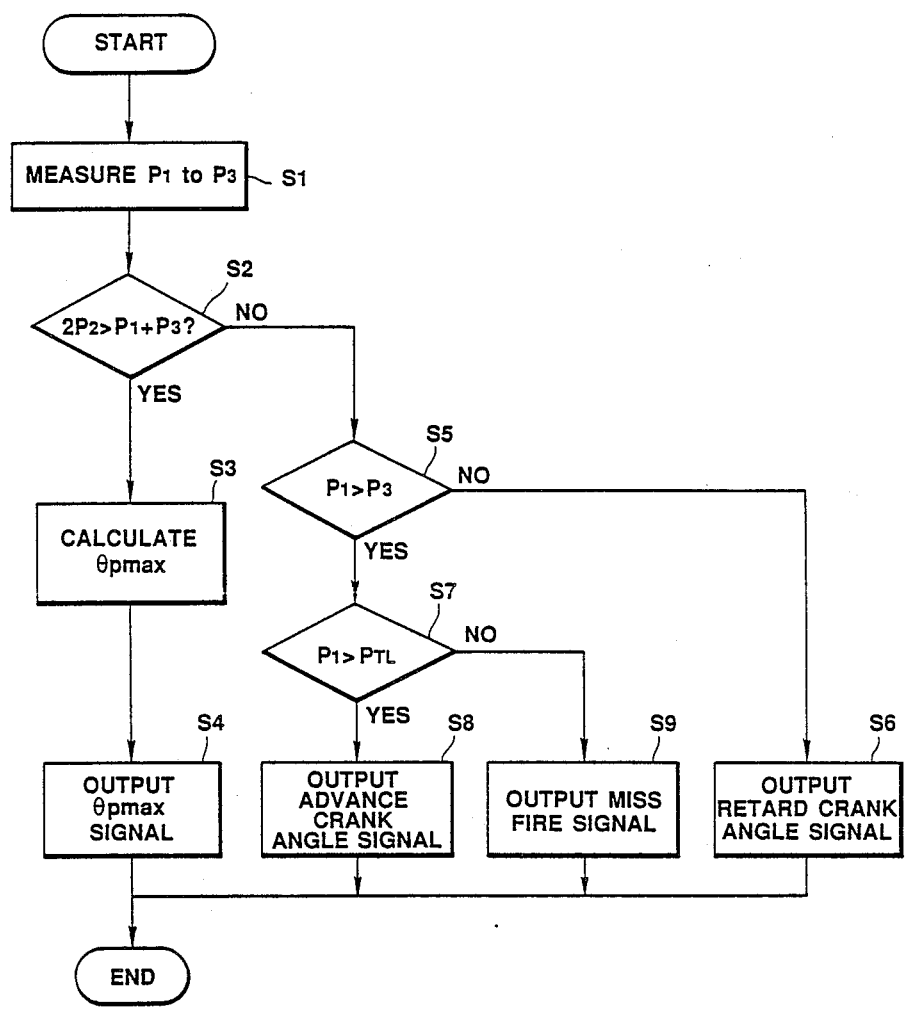
FIG. 3 is a control flowchart for judging ignition timing according to a first embodiment.
Figure 4:
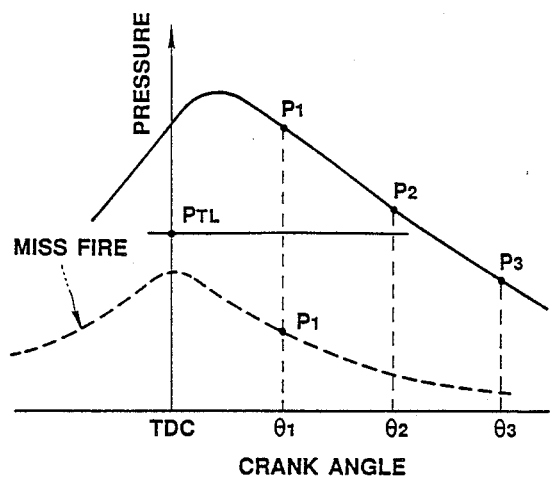
FIGS. 4 and 5 are a series of explanatory graph depicting cylinder pressure curve in relation to missfiring.

With reference to FIGS. 3 and 4, the judging operation, of the first embodiment, for judging whether the ignition timing is advanced or retarded relative to the best ignition timing, by which maximum torque may be generated, will now be described hereinbelow.

First in step 1, the microcomputer 5 outputs the A/D converter timing signal to the A/D converter 2 in response to a crank angle signal outputted from the crank sensor 3 at each of the crank angles $\theta_1$, $\theta_2$, and $\theta_3$. The microcomputer 5 then reads the cylinder pressure signal, at each crank angle $\theta_1$ to $\theta_3$, outputted from the pressure sensor 1 to obtain pressure values $P_1$, $P_2$, and $P_3$. Next, in step 2, the microcomputer 5 determines whether a curve representative of pressure within the cylinder which is defined by the three cylinder pressure values $P_1$, $P_2$, and $P_3$ obtained in the step 1 contains a peak. If $2 \times P_2$ is greater than $P_1 + P_3$, it is deemed that the curve includes a peak and the routine advances to step 3. In the step 3, the values $P_1$, $P_2$, and $P_3$ are employed in a quadratic equation to estimate the crank angle $\theta_{pmax}$ at which the maximum pressure occurs within the cylinder and the routine goes to step 4. In the step 4, the calculated the crank angle $\theta_{pmax}$ signal is outputted to the ignition timing circuit 6. The ignition timing circuit 6 compares the $\theta_{pmax}$ with the target angle $\theta_2$. The ignition timing feedback control is executed according to the above results to advance or retard the ignition timing in the conventional manner. For example, a so-called Minimum Spark Advance for Best Torque control (MBT control) may be employed. The U.S. Pat. Nos. 4,640,249 and 4,660,535 disclose systems for controlling an ignition timing in an internal combustion engine as to MBT control. The contents of these applications are hereby incorporated by reference.

On the other hand, in step 2, if the $2 \times P_2$ is smaller than $P_1 + P_3$ and the curve defined between $P_1$ and $P_3$ is therefore deemed to contain no peak, the routine goes to step 5 wherein $P_1$ is compared with $P_3$. In the step 5, if $P_1$ is smaller than $P_3$, the crank angle $\theta_{pmax}$ is judged to be retarded and the routine goes to step 6. In step 6, a signal indicating retarded ignition timing is outputted. Thereafter, the ignition timing controller 6 advances the ignition timing by a predetermined value.

If, in step 5, $P_1$ is greater than $P_3$, the routine goes to step 7. In step 7, the detected pressure value $P_1$ at the crank angle $\theta_1$ is compared with a predetermined threshold level $P_{TL}$ for detecting whether the engine is missing or not. If $P_1$ is greater than $P_{TL}$, as in the cylinder pressure curve indicated by the solid line in FIG. 4, the crank angle $\theta_{pmax}$ is judged to be advanced and the routine goes to step 8. In step 8 a signal indicating advanced ignition timing is outputted. Thereafter, the ignition timing controller 6 retards the ignition timing by a predetermined value. Alternatively, if $P_1$ is smaller than or equal to $P_{TL}$, as indicated by the dotted line in FIG. 4, the engine is judged to be missing and the routine goes to step 9. In step 9 a signal indicating missfiring is outputted. Thereafter, the ignition timing controller 6 corrects the ignition timing accordingly.

It should be noted that according to the invention the states where the maximum pressure crank angle $\theta_{pmax}$ are overly advanced or retarded can be accurately distinguished from missing of the engine.

Figure 5:
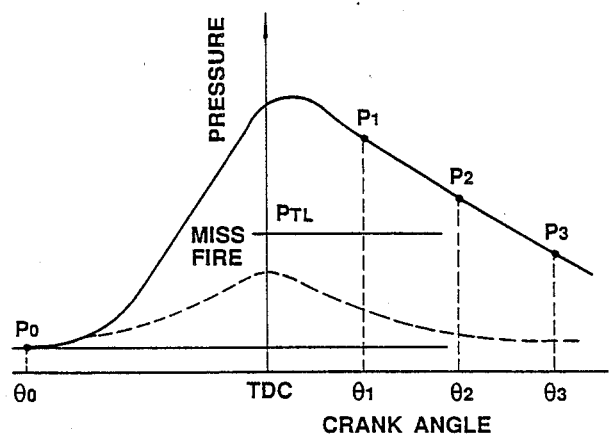

In the above embodiment, when the sensor 1 is other than an absolute pressure sensor, the sensor tends to be influenced by vibrations outputted by an engine or so forth. It is, as shown in FIG. 5, therefore necessary to determine whether missfire occurs or not by comparing the relative pressure value between pressure value $P_1$ and pressure value $P_0$ at crank angle $\theta_0$ which is uneffected by pressure due to combustion with the threshold value $P_{TL}$.

A second embodiment of the invention will be described hereinbelow.

The microcomputer 5 outputs A/D converter timing signals to the A/D converter 2 at four predetermined crank angles $\theta_1$ to $\theta_4$ to read cylinder pressure values $P_1$ to $P_4$, outputted from the pressure sensor 2, representative of pressure within the cylinder which corresponds to the crank angles $\theta_1$ to $\theta_4$ respectively. The microcomputer 5 then determines, mathematically on the basis of the cylinder pressure values $P_1$, $P_2$, and $P_3$, the crank angle $\theta_{pmax}$ at which the maximum pressure within the cylinder occurs, according to the flowchart shown in FIG. 6. Alternatively, the microcomputer 5 judges whether the $\theta_{pmax}$ is advanced or retarded relative to the target angle $\theta_2$ by comparing he magnitudes of the cylinder pressure values $P_1$, $P_2$, $P_3$, and $P_4$ to provide an output signal to the ignition timing controller 6. Where the crank angles $\theta_1$ to $\theta_3$ are within the range defined in the vicinity of the desired angle (15 degrees ATDC) as described in the first embodiment, while the $\theta_4$ is 50 between $\theta_1$ to $\theta_3$ in the direction of rotation of crank angle.

Figure 6:
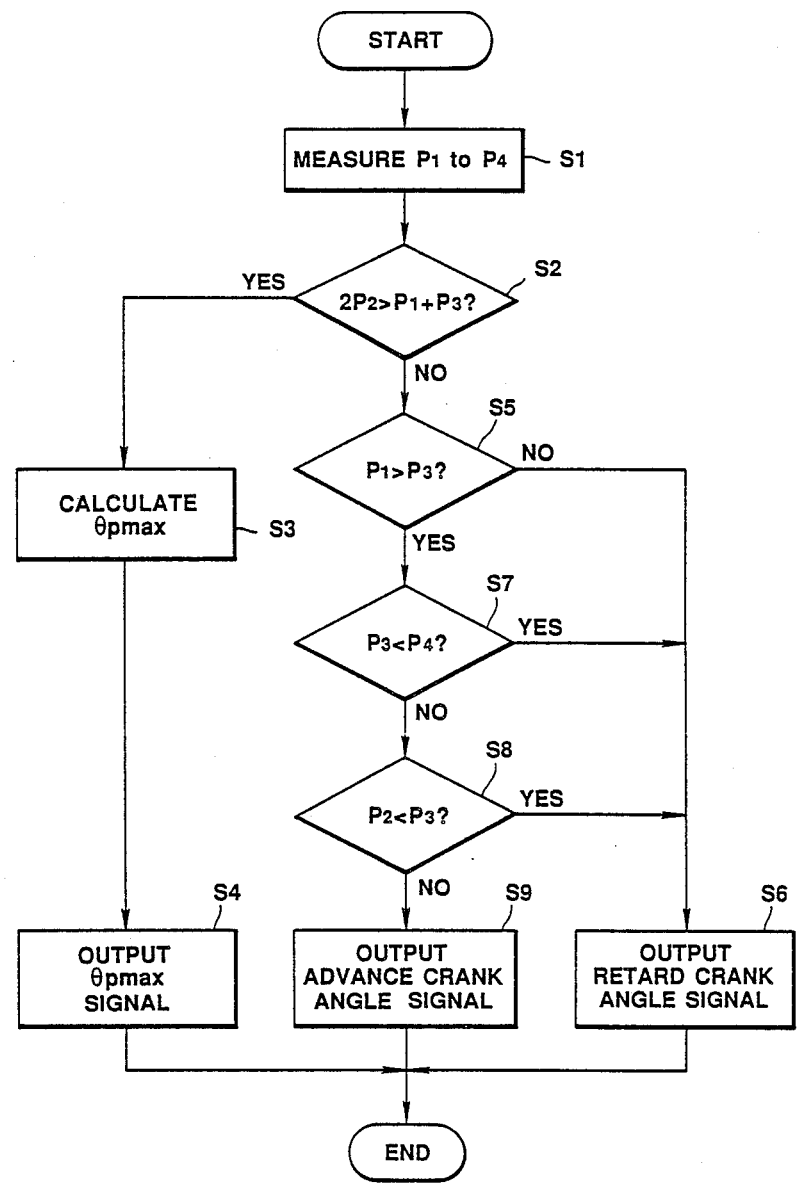
FIG. 6 is a control flowchart for judging combustion timing according to a second embodiment.
Figure 7:
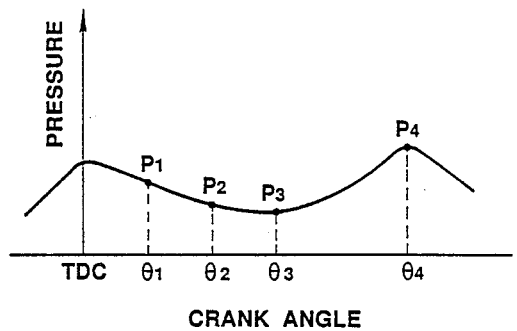
FIGS. 7 and 8 is a explanatory graph which shows the pressure curve within the cylinder when ignition timing is retarded.
Figure 8:
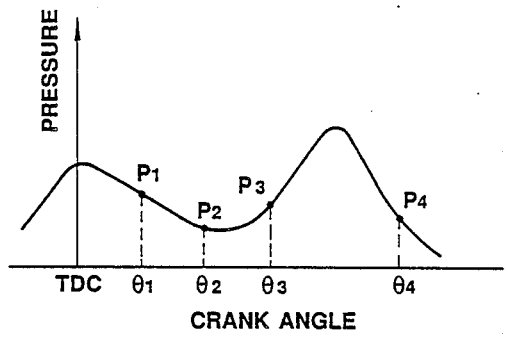

With reference to FIGS. 6, 7, and 8, the detecting operation, of the second embodiment, for judging whether the ignition timing is advanced or retarded according to the invention will be described hereinbelow.

First in step 1, the microcomputer 5 outputs the A/d converter timing signal to the A/D converter 2 in response to a crank angle signal outputted from the crank sensor 3 at each of the crank angles $\theta_1$, $\theta_2$, $\theta_3$, and $\theta_4$. The microcomputer 5 then reads the cylinder pressure signal outputted from the pressure sensor 1 at each crank angle $\theta_1$, $\theta_2$, $\theta_3$, and $\theta_4$, to obtain pressure values $P_1$, $P_2$, $\theta_3$, and $P_4$. Next, in step 2, the microcomputer 5 determines whether a curve representative of pressure within the cylinder which is defined by the three cylinder pressure values $P_1$, $P_2$, and $P_3$ obtained in the step 1 contains a peak. If 2 X $P_2$ is greater than $P_1+P_3$, it is deemed that the curve includes a peak and the routine advances to step 3. In the step 3, the values $P_1$, $P_2$, and $P_3$ are employed in a quadratic equation to estimate the crank angle $\theta_{pmax}$ at which the maximum pressure occurs within the cylinder and the routine goes to step 4. In the step 4, the calculated crank angle $\theta_{pmax}$ signal is outputted to the ignition timing circuit 6. The ignition timing circuit 6 compares the $\theta_{pmax}$ with the target angle $\theta_2$. The ignition timing feedback control is executed according to the above results to advance or retard the ignition timing in the same manner as described in the first embodiment.

On the other hand, in step 2, if 2 X $P_2$ is less than $P_1+P_3$ and the curve defined by $P_1$ to $P_3$ is therefore deemed to contain no peak, the routine goes to step 5 wherein $P_1$ is compared with $P_3$. In step 5, if $P_1$ is smaller than $P_3$, the ignition timing is judged to be retarded and the routine goes to step 6. In step 6, signal representative of the retard ignition timing is outputted. Thereafter, the ignition timing controller 6 advances the ignition timing by a predetermined value.

In step 5, $P_1$ is greater than $P_3$, the routine goes to a step 7. In step 7, $P_3$ is compared with $P_4$ detected at crank angle $\theta_4$. If P is smaller than $P_4$, $\theta_{pmax}$ is retarded from $\theta_2$, or the target angle (see FIG. 7) and the routine goes to step 6. In step 6, a signal indicating crank angle $\theta_{pmax}$ is outputted. Thereafter, the ignition timing controller 6 advances the ignition timing by a predetermined value.

If, in step 7, $P_3$ is greater than $P_4$, the routine goes to step 8. In step 8, wherein $P_2$ is compared with $P_3$, if $P_2$ is smaller than $P_3$ (see FIG. 8), the ignition timing is judged to be retarded and the routine goes to step 6. In step 6, a signal indicating retarded ignition timing is outputted. Thereafter, the ignition timing controller 6 advances the ignition timing by a predetermined value. If $P_2$ is greater or equal to $P_3$, the ignition timing is judged to be advanced and the routine goes to step 9. In step 9, a signal indicating advanced ignition timing is outputted. The ignition timing controller 6 retards the ignition timing by a predetermined time.

It should be noted that according to the above crank angle detecting system, greatly advanced ignition timing may be accurately discerned from the greatly retarded ignition timing by detecting pressure within the cylinder at a minimum number of crank angles. And the precise angle $\theta_{pmax}$ may be accurately calculated when $\theta_{pmax}$ is in the vicinity of the target angle (15 degrees ATDC). Thus, the precision of the feedback control of the ignition timing is greatly improved.

What is claimed is:

1. A system for detecting a maximum pressure crank angle at which the pressure within a firing cylinder of an internal combustion engine is maximum and whereby detecting offset of said maximum pressure crank angle from a predetermined target angle, comprising:

first means for monitoring engine crank angle to produce first signals indicative of first, second and third crank angles within a range defined in the vicinity of said target angle;

second means for monitoring engine crank angle to produce a second signal indicative of a fourth crank angle outside of said range;

third means for monitoring pressure in said firing cylinder, said third means being responsive to said first and second signals, for producing a pressure value indicative of pressure within said firing cylinder at said first, second, third, and fourth crank angles;

fourth means, for comparing said pressure values at said first, second, and third crank angles, for projecting said maximum pressure crank angle when said maximum pressure crank angle is included within said range; and fifth means for deriving direction and magnitude of offset of said maximum pressure crank angle to said target angle based on said pressure values at said first, second, third, and forth angles when said maximum pressure crank angle is not included within said range.

2. A system as set forth in claim 1, wherein said first angle is the most advanced angle, said second an is the nearest said target angle and said third angle is the most retarded angle within said range.

3. A system as set forth in claim 2, wherein said fourth means projects said maximum pressure crank angle when the pressure value at said second angle multiplied by 2 is greater than the sum of that at said first and third angles.

4. A system as set forth in claim 1, wherein said third means projects said maximum pressure angle by defining a pressure curve on the basis of said pressure values at said first, second, and third angles within said range.

5. A system as set forth in claim 2, wherein said fifth means derives direction of and magnitude offset of maximum pressure angle to said target angle by comparing magnitude of said pressure values at said first, second, third, and fourth angles with each other when the pressure value at said second angle multiplied by 2 is smaller than the sum of that at said first and third angles.

6. A system as set forth in claim 5, wherein said fifth means determines that said maximum pressure angle is retarded relative to said target angle when the magnitude of said pressure value at said third angle is greater than that at said first angle within said range.

7. A system as set forth in claim 6, wherein said, fifth means determines that said maximum pressure angle is retarded relative to said target angle when the magnitude of said pressure value at said third point is smaller than that at said first angle within said range and is smaller than that at said fourth angle outside of said range.

8. A system as set forth in claim 7, wherein said fifth means determines that said maximum pressure angle retarded relative to said target angle when the magnitude of said pressure value at said third angle within said range is smaller than that at said first point within said range and is greater than that at said fourth angle outside of said range and that at said second angle within said range.

9. A system as set forth in claim 8, wherein said fifth means determines that said maximum pressure angle is advanced relative to said target angle when the magnitude of said pressure value at said third angle within said range is smaller than that at said first angle within said range and that at said second angle and is greater than that at said fourth angle outside of said range.

10. A system as set forth in claim 1, wherein said first, second, and third angles within said range are at seven degrees, fifteen degrees, and twenty three degrees after top dead center.

11. A system as set forth in claim 10, wherein said target angle at fifteen degrees after top dead center.

12. A system as set forth in claim 11, wherein said fourth angle outside of said range is fifty degrees after top dead center.

13. A system as set forth in claim 2, further comprising sixth means for discriminating missfire from advanced ignition timing by comparing magnitude of said pressure value at said first angle within said range with a predetermined reference pressure value.

14. A system as set forth in claim 6, further comprising sixth means for judging that missfire has occurred when said magnitude value of the pressure at said first angle is greater than that of the pressure at said third angle and is smaller than a predetermined reference pressure value.

15. A system for detecting a maximum pressure crank angle at which the pressure within a firing cylinder of an internal combustion engine is maximum and whereby detecting offset of said maximum pressure angle from a predetermined target angle, comprising:
first means for monitoring engine crank angle to produce first signals indicative of first, second, and third crank angles within a range defined in the vicinity of said target angle;
second means for monitoring pressure in said firing cylinder, said second means being responsive to said first signals, for producing a pressure value indicative of the pressure within said firing cylinder at said first, second, and third angles within said range;
third means, for comparing said pressure values at said first, second, and third angles, for projecting said maximum pressure angle when said maximum pressure angle is included within said range;
fourth means for deriving direction and magnitude of offset of said maximum pressure angle to said target angle based on said pressure value at said first and third angles when said maximum pressure angle is not included within said range; and
fifth means for discriminating whether said maximum pressure angle is advanced relative to said target angle missfire, by comparing said pressure value at said first angle with a reference pressure value when said maximum pressure angle is not included within said range.

16. A system as set forth in claim 15, wherein said first angle is the most advanced point, said second angle is the sensed angle nearest said target angle and said third angle is the most retarded angle within said range.

17. A system as set forth in claim 16, wherein said third means projects said maximum pressure angle when the pressure value at said second angle multiplied by 2 is greater than the sum of that at said first and third angles.

18. A system as set forth in claim 15, wherein said third means projects said maximum pressure angle by defining a pressure curve on the basis of said pressure values at said first, second, and third angles within said range.

19. A system as set forth in claim 16, wherein said fourth means determines that said maximum pressure angle is retarded relative to said target angle when the magnitude of said pressure value at said third angle is greater than that at said first angle.

20. A system as set forth in claim 19, wherein said fourth means determines that said maximum pressure angle is advanced relative to said target angle when the magnitude of said pressure value at said first angle is greater than that at said third angle within said range and said reference pressure value.

21. A system as set forth in claim 20, wherein said fifth means judges that missfire has occurred when the magnitude of said pressure value at said first angle is greater than that at said third angle and is smaller than said reference pressure value.

22. A crank angle detecting system for an internal combustion engine having a plurality of cylinders and a crankshaft comprising:
first means for detecting the angular position of a crankshaft;
second means for sensing pressure within the cylinder at each of three or more predetermined crank angular positions in a range defined in the vicinity of a target crankshaft angular position for maximum pressure to occur and at a predetermined crankshaft angular position outside of said range;
third means for judging whether a crankshaft angular position $\theta_{pmax}$ at which pressure within the cylinder is maximum can be calculated or not according to variations of the pressure within said range;
fourth means for determining whether said $\theta_{pmax}$ is advanced or retarded relative to said target angle according to variations of the pressure within said range and at said position outside of said range when said calculation is impossible; and
fifth means for calculating said crankshaft angular position $\theta_{pmax}$ when said position $\theta_{pmax}$ is within said range.

23. A system as set forth in claim 22, wherein the determination of said fourth means is carried out on the basis of comparison of the magnitude of the pressure within said range and at said position outside of said range.

24. A system as set forth in claim 22, further comprising sixth means for discriminating a state where said $\theta_{pmax}$ is advanced from said target position from the occurrence of missfire by comparing the pressure value within said range with a reference pressure value.

25. A system as set forth in claim 24, wherein said reference pressure value is between pressure value within the cylinder occurring due to compression when missfire occurs and a pressure value occurring within the cylinder when no missfire occurs.

26. A crank angle detecting system for an internal combustion engine having a plurality of cylinders and a crankshaft comprising:
first means for detecting the angular position of a crankshaft;
second means for sensing pressure within a cylinder at each of three or more predetermined crank angular positions in a range defined in the vicinity of a predetermined target crankshaft angular position for the maximum pressure to occur and at a predetermined crankshaft angular position outside of the range;
third means for judging whether a crankshaft angular position $\theta_{pmax}$ at which pressure within the cylinder is maximum can be calculated or not according to variations of pressure within said range; and fourth means for adjusting an ignition timing so as to enable said $\theta_{pmax}$ to be calculated by comparing magnitude of the pressure within said range with that at said position outside of said range.

27. An ignition timing control system for detecting a crank angle at which maximum pressure occurs within a firing cylinder of an internal combustion engine and detecting offset of said maximum pressure angle from a predetermined target angle, comprising:

first means for monitoring engine crank angle to produce first signals indicative of first, second and third crank angle within a range defined in the vicinity of said target point;

second means for monitoring engine crank angle to produce a second signal indicative of a fourth crank angle outside of said range;

third means for monitoring pressure in said firing cylinder, said third means being responsive to said first and second signals, for producing a pressure value indicative of the pressure within said firing cylinder at said first, second, third, and fourth angle;

fourth means, for comprising said pressure values at said first, second, and third angles, for projecting said maximum pressure angle when said maximum pressure angle is included within said range;

fifth means for deriving direction and magnitude of offset of maximum pressure angle to said target angle based on said pressure values at said first, second, third, and forth angles when said maximum pressure angle is not included within said range;

sixth means for adjusting an ignition timing so as to enable said maximum pressure to be projected according said direction and magnitude of offset derived by fifth means; and seventh means for controlling the ignition timing by calculating the angle between said maximum pressure angle projected by fourth means and said target angle.

* * * * *

UNITED STATES PATENT AND TRADEMARK OFFICE
CERTIFICATE OF CORRECTION

PATENT NO. : 4,892,075

DATED : January 9, 1990

INVENTOR(S) : Iriyama et al

It is certified that error appears in the above-identified patent and that said Letters Patent is hereby corrected as shown below:

Col. 8, line 26, change "an" (third occurrence) to --angle--;
       line 50, delete "," (second occurrence).

Col. 9, line 51, after "angle" insert --from--.

Col. 11, line 14, change "angle" to --angles--.

Col. 12, line 3, change "angle" to --angles--;
        line 4, change "comprising" to --comparing--.

Signed and Sealed this

Sixth Day of August, 1991

Attest:

HARRY F. MANBECK, JR.

Attesting Officer

Commissioner of Patents and Trademarks